Feb. 19, 1935.                F. CZAPAR, JR                    1,991,546
MEAT TENDERER
Filed Nov. 20, 1933
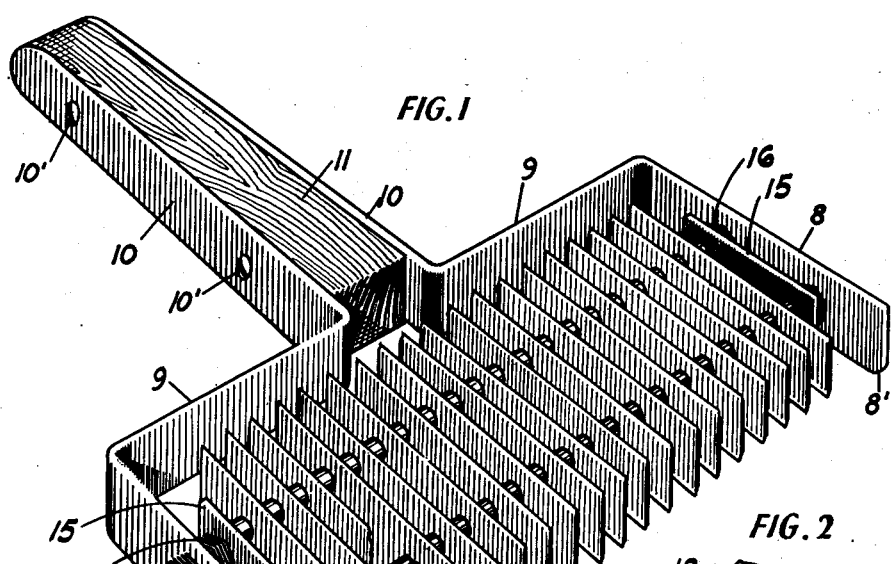
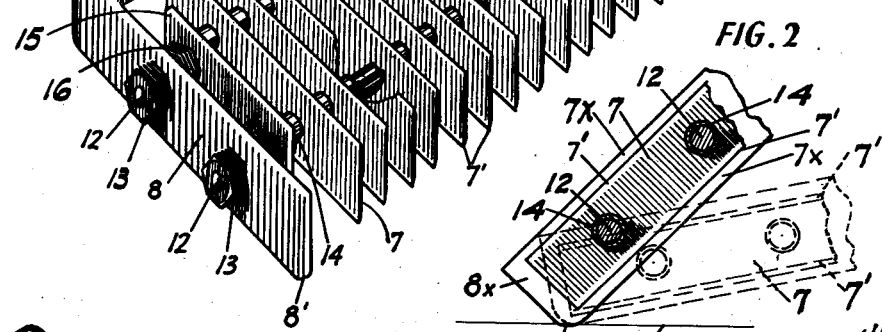
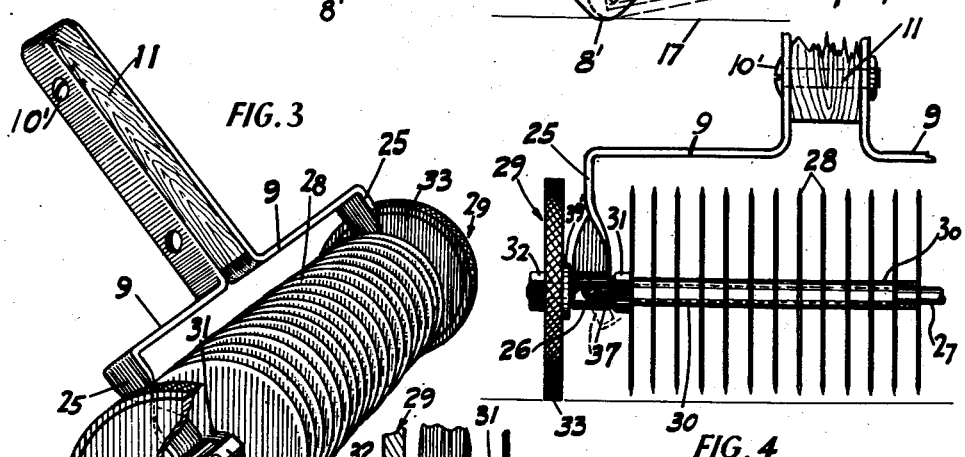
INVENTOR.
FRANK CZAPAR Jr.
BY
ATTORNEY Patented Feb. 19, 1935

1,991,546

UNITED STATES PATENT OFFICE 1,991,546

MEAT TENDERER

Frank Czapar, Jr., Los Angeles, Calif.

Application November 20, 1933, Serial No. 698,786

3 Claims. (Cl. 17—30)

This invention relates to improvements in meat-tenderers of the multi-blade type such as are used in the preparation of cube or diced steaks and other meat cuts to facilitate cooking, render them more tender, and promote their savoriness.

In preparing individual servings of certain kinds of steaks, commonly known as cube or diced steaks, it is of common knowledge to kerf the surface of the steak by a series of right angle cuts to a distance approximately the full depth of the steak.

Meats usually offered for individual servings which are commonly known as cube or diced steaks, consist of cuts taken from the round, bottom round, sirloin tips, and boneless pieces of the meat of a size approximately four and one-half inches square and one-half inch thick. On one side thereof are produced a plurality of right angle cuts or kerfs ranging in depth from three-eights of an inch to seven sixteenths of an inch or even slightly more in certain kinds of meats all depending on the choice of cut selected.

The purpose of cubing or serrating the surface of steaks or other cuts of meat is to increase the price of the cheaper cuts of meats and at the same time enhance their palatability.

The palatability of meat is enhanced by presenting a greater area at one time to the frying fat and by cutting the steak in such a manner that when it is introduced to a hot fat or a flame the surface of the peculiarly formed parts will at once become seared and the juice cells sealed whereby a tasty, juicy steak will result.

The celebrated flavor of serrated meat is the result of the additional cooking surface made by proper serrating. The present tool is not only adapted for serrating beef steaks, but veal, lamb, pork and mutton may be tenderized in a like manner thus producing a delicious and tasty serving of meat at all times.

The blades of my newly invented meat tenderer produce a slicing cut which is the most effective meat cut. A direct pressure cut without any tangential movement of the knife whatever causes the juice pockets and nourishment cells to become bruised and broken so that when the meat comes in contact with the hot pan or grill, the juices will exude leaving a dry, flavorless steak.

A more tender cut of meat need not be serrated so deeply. A less tender cut may be serrated so deeply that the kerf extends nearly thru the steak. At no time is it possible by the use of my tool, at any angle or manner in which it may be manipulated, to cause the knives to penetrate the entire thickness of the steak. Also in whatever thickness a steak may be presented for serration the manipulation of the tool is just the same and just as effective.

The improved serrater disclosed by the present application accomplishes several distinct advantages in a single slicing stroke. The meat is clean cut. Varying the angle at which the tool is held in relation to the surface upon which the meat is supported produces an uneven film of meat at the bottom so that the meat not only remains in one piece but the frying fat and steam is permitted to permeate thru the entire piece, thereby aiding the chef to not only produce a savory steak, but also permitting more and quicker servings at rush intervals.

The cubing and waffling of steak surfaces has heretofore been accomplished through the use of expensive machines and tools, the price of which makes their use prohibitive for the small consumer. The present invention does the work effectively by a greatly simplified and far less expensive device.

Since the flavor of meat is in proportion to the cooking surface exposed to the heat, it will be obvious how the present method of serration improves the flavor on account of the heat immediately penetrating all sides of the serrated portions, at once searing and immediately closing all the juice pockets so that a tender and juicy steak will necessarily result.

One object of the invention is to provide improved runners for supporting the cutting blades and varying the depths of the cuts made by them, said runners having bearing surfaces which are curved in a novel and improved manner in order that varying the angle at which the tool is held as these runners are moved across the surface upon which the meat is supported may more effectively control the depths of the cuts.

Still another important object of the invention is to maintain a variable spaced relation of the edge of the knives with the cutting block or the lower side of a steak or piece of meat which may rest on such block.

Among further objects of the invention are; to provide a frame to act as a guard for the knives; to provide knives which are reversible whereby a plurality of cutting edges are adjustable for wear; to provide batteries of knives which are maintained as a unit when the device is disassembled; to provide a device, no matter in what position it may be held the blades will be prevented from completely cutting thru the steak.

Referring to the accompanying drawing, which illustrates what are at present deemed to be preferred embodiments of the invention, Fig. 1 is a perspective view of the device, small fragments being broken away in order to disclose the underlying structure.

Fig. 2 is a fragmental sectional view of one of the front corner portions of the device, one operative position thereof being shown in full lines and another in broken lines.

Fig. 3 is a perspective view of a modification.

Fig. 4 is a rear elevation of the device shown in Fig. 3, a portion of the structure being broken away to contract the view.

Fig. 5 is a longitudinal mid-sectional detail, on an enlarged scale, of the left hand portion of Fig. 4.

Referring in detail to the structure shown in Figs. 1 and 2 of the drawing, a battery of elongated, rectangular cutting blades 7 is disposed between the arms 8 of the bent metallic strips 9. Said strips have shank portions 10 which are secured to opposite sides of the handle 11 by any suitable means as, for example, the screw bolts 10'.

The space between the arms 10 is spanned by the two parallel shafts 12, the end portions of said shafts projecting thru and being secured to the arms 8 desirably by means of nuts 13 which are screwed on to the ends of said shafts. Said shafts also extend thru spacers 14 located between the blades 7 and thru the clamping plate 15. With said clamping plates 15 cooperate clamping nuts 16 whereby the battery of blades 7 may be held securely together in the assembled position.

The blades 7 may be of a two-edged character, and in Figs. 1 and 2 of the drawing are shown provided with downwardly directed cutting edges 7'. In order to regulate the depth of the cuts made by said blades the arm 8 of each side strip 9 is made to extend somewhat below the plane occupied by the cutting edges 7', and said arms are also extended out somewhat beyond alignment with the outer ends of the blades 7. Hence when a piece of steak is laid upon a plane surface 17 as indicated in Fig. 2 and the device drawn across the steak while so positioned, the cutting edges 7' are prevented from completely severing the meat.

The end plates or arms 8 constitute runners, and are provided with rounded lower corners at 8' of an involute or cycloidal nature. This structure not only prevents scratching the surface with which the runners come into contact but also enables the operator, by changing the angle at which the handle 11 is held to vary the depth of the cuts at a single slicing stroke. It is to be understood that they are spaced sufficiently far apart to include between them the greatest dimension of any piece of meat upon which the device is designed to operate. The upper portion of the steak will be cut into squares by drawing the device thereacross in two directions extending at substantially right angles to each other.

As shown in Fig. 2 the width of the space 7x is less than that of the space 8x. That is to say the outer ends of the arms 8 extend a considerable distance beyond alignment with the outer ends of the blades 7, while the lower edges of the arms 8 lie nearer the plane occupied by the cutting edges 7'. Therefore, as indicated in Fig. 2, the depth of cuts made will depend upon the inclination at which the device is held while being drawn across the meat. When steeply inclined, as indicated in full lines, a more shallow cut will be made than when operated in the less inclined position indicated in broken lines.

In Figs. 3 and 4 the strips 9 of the supporting and operating means are shown provided with end arms 25 which are given a half twist and have curls 26 at their extremities in order to secure them to the end portions of a single shaft 27. In these views the rectangular cutting blades are replaced by a series of circular blades 28, and rotatable wheels or disks 29 of slightly greater diameter than the blades are mounted upon the end portions of the shaft 27. Spacers 30 are shown between the blades 28, also an internal clamping nut 31 and a wheel nut 32 are shown, it being understood that like nuts are located at the other side of the device. The wheels 29 are shown provided with compressible rubber tires 33.

Fig. 5 shows the construction of the shaft 27 and of the securing means which is applied thereto. The end portion 35 of the shaft is diametrically reduced in order that the centrally apertured cutting disks 28 together with the spacers 30 may be held in place by the clamping nut 31 which is screwed on to threads at the end of the body portion of the shaft, thus permitting the shaft to have an unthreaded portion near its end to receive the bearing curl 26, the wheel or disk 29, and the washer 39'.

A spring clip 37 is shown having one of its end portions riveted to one of the curls 26 and thereby swivelled so as to have its free end swung to and from flatwise engagement with any selected side of the adjacent octagonal clamping nut 31.

By swinging the clip 37 out of engagement with the nut 31 the shaft 27 is released and may then be rotated thru one or more arcs of forty-five degrees, whereupon said clip may be swung back into engagement with the nut thus locking the cutting disks in a position wherein an unused arcuate portion of their cutting edges is brought into the operative position.

Owing to the compressible character of the tire 33 the operator can, by varying the downward pressure of the wheels 27 against the supporting surface, vary also the depth of cuts made in the steak or other meat as the traction means is utilized to move the device thereacross.

I claim:

1. In a device of the kind described, a handle member having a bent strip of metal detachably secured to each of opposite sides thereof, each of said strips of metal terminating in an arm which is in substantially parallel spaced relation to the corresponding arm of the other strip, a pair of parallel shafts having end portions secured to said arms, said shafts spanning the space between said arms, a series of parallel cutting blades mounted between and terminating short of said arms and each having holes to fit said shafts, spacers between said blades, said shafts extending thru said spacers, and means to clamp said blades in the assembled position.

2. In a device of the kind described, a handle member having a bent strip of metal secured to each of opposite sides thereof, each of said strips of metal terminating in an arm which is in substantially parallel spaced relation to the corresponding arm of the other strip, a pair of parallel shafts having end portions secured to said arms, said shafts spanning the space between said arms, a series of parallel cutting blades mounted between said arms and each having holes to fit said shafts, spacers between said blades, said shafts extending thru said spacers, and means to clamp said blades in the assembled position, the extremities of said arms extending beyond alignment with the cutting edges of said blades and having corner portions positioned to engage a plane surface and curved in such a manner as to enable the operator to vary the depth of the cuts made by said blades.

3. In a device of the kind described, supporting means including spaced runners, and a battery of blades mounted between and supported by said runners, said runners having foot portions extending beyond alignment with the edges of said blades and being curved in an involute manner to support the edges of the blades at varying distances from a plane surface, as said blades are caused to perform a slicing action.

FRANK CZAPAR, JR.